(12) United States Patent
Barros et al.

(10) Patent No.: US 11,606,529 B2
(45) Date of Patent: Mar. 14, 2023

(54) CHANNEL LAYERING OF VIDEO CONTENT FOR AUGMENTED REALITY (AR) OR CONTROL-BASED SEPARATION

(71) Applicant: Google LLC, Mountain View, CA (US)

(72) Inventors: Brett Barros, San Mateo, CA (US); Alexander James Faaborg, Mountain View, CA (US)

(73) Assignee: Google LLC, Mountain View, CA (US)

( * ) Notice: Subject to any disclaimer, the term of this patent is extended or adjusted under 35 U.S.C. 154(b) by 168 days.

(21) Appl. No.: 16/949,172

(22) Filed: Oct. 16, 2020

(65) Prior Publication Data

US 2022/0124279 A1    Apr. 21, 2022

(51) Int. Cl.
| | |
|---|---|
| *H04N 5/445* | (2011.01) |
| *G06T 19/00* | (2011.01) |
| *G06F 3/01* | (2006.01) |
| *G06F 3/14* | (2006.01) |
| *G06K 9/00* | (2022.01) |
| *A63F 13/26* | (2014.01) |
| *A63F 13/537* | (2014.01) |
| *G06V 20/40* | (2022.01) |

(52) U.S. Cl.
CPC ............ *H04N 5/445* (2013.01); *A63F 13/26* (2014.09); *A63F 13/537* (2014.09); *G06F 3/013* (2013.01); *G06F 3/1423* (2013.01); *G06T 19/006* (2013.01); *G06V 20/41* (2022.01); *A63F 2300/8082* (2013.01); *G06V 2201/10* (2022.01)

(58) Field of Classification Search
CPC ...... H04N 19/46; H04N 19/597; H04N 19/70; H04N 13/172; H04N 21/234327; H04N 21/2353; H04N 21/25825; H04N 21/4394; H04N 21/44008; H04N 21/445; H04N 21/454; H04N 21/47; H04N 5/44504; H04N 5/45; H04N 9/8205; A63F 13/26; A63F 13/355; A63F 13/533; A63F 13/537; A63F 2300/8082; G06F 3/1423; G06T 19/006; G06V 2201/10; G06V 20/41; G09G 2340/12; H04L 65/613; H04L 65/756; H04L 65/1016
See application file for complete search history.

(56) References Cited

U.S. PATENT DOCUMENTS

| | | | |
|---|---|---|---|
| 9,424,882 B2 | 8/2016 | Issa et al. | |
| 2005/0017890 A1* | 1/2005 | Nam | H04N 21/8543 348/E5.103 |
| 2018/0190025 A1* | 7/2018 | Paul | G06F 16/444 |
| 2019/0096367 A1* | 3/2019 | Yuen | G06T 19/006 |
| 2019/0130655 A1* | 5/2019 | Gupta | H04N 21/41265 |
| 2019/0261050 A1 | 8/2019 | Neumeier et al. | |
| 2020/0342685 A1* | 10/2020 | Abe | G01B 5/008 |
| 2021/0374839 A1* | 12/2021 | Luo | G06Q 30/0643 |

* cited by examiner

*Primary Examiner* — Lawrence S Galka
(74) *Attorney, Agent, or Firm* — Brake Hughes Bellermann LLP

(57) ABSTRACT

A method including receiving at least one frame of a video targeted for display on a main display (or within the boundary of the main display), receiving metadata associated with the at least one frame of the video, the metadata being targeted for display on a supplemental display (or outside the boundary of the main display), and formatting the metadata for display on the supplemental display (or outside the boundary of the main display).

33 Claims, 9 Drawing Sheets

CHANNEL LAYERING OF VIDEO CONTENT FOR AUGMENTED REALITY (AR) OR CONTROL-BASED SEPARATION

FIELD

Embodiments relate to streaming video.

BACKGROUND

Video in a streaming application is compressed at the server, communicated to a display device, decompressed and displayed on the display device. All of the content including video data, text associated with the video data, advertisements, logos, and/or the like are wrapped together and communicated together as video data. In other words, the video is flat and fully controlled by the streaming video provider.

SUMMARY

In a general aspect, a device, a system, a non-transitory computer-readable medium (having stored thereon computer executable program code which can be executed on a computer system), and/or a method can perform a process with a method including receiving at least one frame of a video targeted for display on a main display (or within the boundary of the main display), receiving metadata associated with the at least one frame of the video, the metadata being targeted for display on a supplemental display (or outside the boundary of the main display), and formatting the metadata for display on the supplemental display (or outside the boundary of the main display).

Implementations can include one or more of the following features. For example, the at least one frame of the video can be included in a first layer of a layered video and the metadata is included in at least one second layer of the layered video. The supplemental display can be associated with an augmented reality (AR) headset and the formatting of the metadata for display can include formatting the metadata for display on the AR headset, the method further comprising displaying the formatted metadata on the AR headset. The supplemental display can be associated with an augmented reality (AR) headset, the formatting of the metadata for display can include formatting the metadata for display on the AR headset, in response to a user of the AR headset moving a gaze outside the boundary of the main display, displaying the formatted metadata on the AR headset, and in response to the user of the AR headset moving the gaze inside the boundary of the main display, hiding the formatted metadata.

The formatting of the metadata for display can include formatting the metadata for display on the main display, in response to a first action of a viewer of the main display, displaying the formatted metadata on the main display, and in response to a second action of the viewer of the main display, hiding the formatted metadata. The formatting of the metadata for display can include formatting the metadata for display on the main display, in response to a first time-based trigger, displaying the formatted metadata on the main display, and in response to a second time-based trigger, hiding the formatted metadata. The formatting of the metadata for display can includes formatting the metadata for display on the main display, in response to a first event-based trigger, displaying the formatted metadata on the main display, and in response to a second event-based trigger, hiding the formatted metadata.

The formatting of the metadata for display can include formatting the metadata for display on the main display, in response to detecting the presence of the supplemental display, displaying the formatted metadata on the supplemental display, and in response to determining the supplemental display is no longer present, hiding the formatted metadata. The supplemental display can be associated with a computing device, the formatting of the metadata for display can include formatting the metadata for display on the computing device, in response to a first action of a user of the computing device, displaying the formatted metadata on a display of the computing device, and in response to a second action of the user of the computing device, hiding the formatted metadata. The computing device can be at least one of a laptop computer, a desktop computer, a television, a smart watch, a tablet, and a mobile device. The metadata can include a stylesheet, the method further includes determining a device to display the metadata on, and looking-up a display format for the device in the stylesheet, wherein the formatting of the metadata for display includes using the format looked-up in the stylesheet.

The metadata can include first metadata received from a first remote device and second metadata received from a second remote device. The at least one frame of a video can be associated with an interactive game stream. The metadata can be embedded in the at least one frame of the video, the method can further include extracting the metadata from the at least one frame of the video before formatting the metadata for display. The metadata can include at least one three-dimensional object. The metadata can include at least a portion of a spherical video.

In another general aspect, a device, a system, a non-transitory computer-readable medium (having stored thereon computer executable program code which can be executed on a computer system), and/or a method can perform a process with a method including receiving a video, separating the video into a first layer including video data and at least one second layer including metadata, generating a stylesheet for displaying the metadata on at least one device, adding the stylesheet to the metadata, communicating the first layer in a first data packet and communicating the at least one second layer in at least one second data packet. Implementations can include one or more of the following features. For example, the method can further include recognizing at least one object in the video data and adding at least one label corresponding to the at least one object to the metadata.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Streaming video that is communicated using a streaming video application is fully controlled by the content provider. Other than the typical video controls (e.g., play/stop/pause/fast forward/rewind), the consumer of the video can have limited control over the content, what content is displayed, how the content is displayed, the presentation of supplemental data or content, and/or the like. Example embodiments deliver (e.g., stream) video content as a layered video. A layered video can include a plurality of layers where a first layer includes the video data and at least one second layer includes metadata. Layered video can be rendered in ordered layers (e.g., video in a bottom layer and other content on top of the video) or outside the boundaries of a main display (e.g., on display devices not including the television).

The metadata can include supplemental data and/or content associated with the video data. The metadata can be displayed independent of the video data. This can allow the consumer of the video content to control what supplemental data and/or content can be displayed, where (e.g., where on a display, where external to the display, what displays, and/or the like) the supplemental data and/or content can be displayed, and/or how the supplemental data and/or content can be displayed. Giving the consumer control over the supplemental data and/or content can create a more desirable user experience when using a streaming video application. In addition, the example implementations can give the content provider a variety of tools for delivering supplemental data and/or content in the streaming video application.

Figure 1:
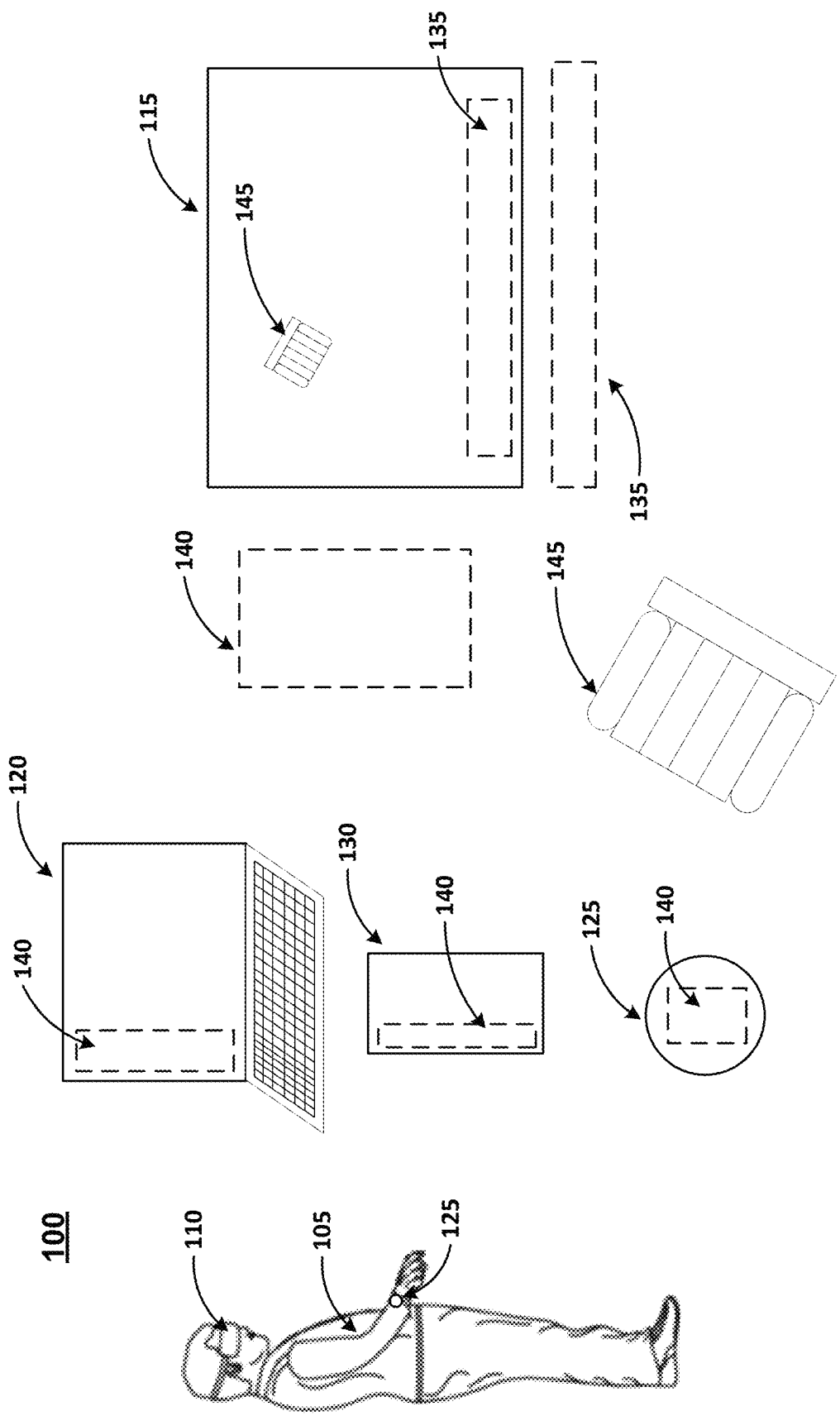
FIG. 1 illustrates a system for displaying layered video according to at least one example embodiment.

FIG. 1 illustrates a system for displaying layered video according to an example embodiment. As shown in FIG. 1 system 100 includes a user 105, an augmented reality (AR) headset 110, a display 115, a laptop device 120, a smart watch 125, a mobile device 130, supplemental content 135, supplemental content 140, and an object 145. In the example implementation of system 100, a layered video has been received (e.g., streamed) from at least one remote device (e.g., at least one server).

The user 105 can be viewing a video on display 115 (e.g., as a primary or main display). The video can be a layered video. The layered video can include video data and metadata. The video data can be displayed on display 115 (e.g., a target display area). The metadata can include content that can be targeted for display on a supplemental display (e.g., displayed outside the boundaries of the display 115, displayed on a display of the headset 110, a laptop device 120, a smart watch 125, and/or a mobile device 130). Further, the content can be moved between being displayed on the targeted display (e.g., display 115) and not being displayed on the targeted display.

For example, supplemental content 135 can be targeted for display on a main display and at least one supplemental display (e.g., displayed outside the boundaries of the display 115, displayed on a display of the headset 110, a laptop device 120, a smart watch 125, and/or a mobile device 130). In other words, the supplemental content 135 can be displayed inside the boundaries of the display 115 and outside the boundaries of display 115. In an example implementation, supplemental content 135 can be switched back and forth between being displayed outside the boundaries of the display 115 and inside the boundaries of the display 115 in response to an action of the user 105 (e.g., by pressing a button on a remote control device), in response to an event in the video (e.g., a goal being scored in a sporting event), in response to detecting (or determining) the presence of a supplemental display, and/or based a time-based trigger (e.g., shown inside the boundaries of the display 115 for 10 seconds and then switched to being displayed outside the boundaries of the display 115).

In an example implementation, the user 105 is wearing and using the AR headset 110. In this example, the user can view the supplemental content 135 on a display of the AR headset 110 when the supplemental content 135 is being target for the supplemental display (e.g., to be displayed outside the boundaries of the display 115). However, if the user 105 is not wearing and using the AR headset 110, the supplemental content 135 may not be viewed by the user when the supplemental content 135 is being displayed outside the boundaries of the display 115. In other words, the supplemental content 135 may be hidden from view if the user 105 is not wearing and using the AR headset 110. In an example implementation, the metadata can include at least a portion of a spherical video. For example, the spherical video could be displayed on the AR headset 110 such that the spherical video is positioned to line up with the video being shown on the display 115.

Further, one or more dimensions associated with the supplemental content 135 can be different when the supplemental content 135 is being targeted for on the supplemental display as compared to when the supplemental content 135 is targeted for display on the main display (e.g., the display 115). For example, as illustrated in FIG. 1, the supplemental content 135 is wider when being displayed outside the boundaries of the display 115 as compared to when the supplemental content 135 is being displayed inside the boundaries of the display 115. The dimensions, as well as other display characteristics, can be indicated by a stylesheet that is included in the metadata. The stylesheet can include a display format for the device on which supplemental content can be displayed.

In an example implementation, the user 105 can be associated with devices including a display that are not physically coupled to the display 115. For example, the user 105 can be associated with (e.g., can view a display coupled to) the laptop device 120, the smart watch 125, and/or the mobile device 130. The supplemental content 140 can be associated with the layered video and targeted for display on at least one supplemental display. For example, the supplemental content 140 can be displayed on the display of the AR headset 110, the laptop device 120, the smart watch 125, and/or the mobile device 130. For example, the supplemental content 140 can be displayed concurrently on multiple devices viewed by two or more users (e.g., a first user can view the supplemental content 140 on the AR headset 110 while a second viewer can view the supplemental content 140 on the mobile device 130). For example, the supplemental content 140 can be displayed concurrently on multiple devices viewed by the same user (e.g., a user can view the supplemental content 140 on the laptop device 120 while also viewing the supplemental content 140 on the mobile device 130).

As illustrated in FIG. 1, one or more dimensions associated with the supplemental content 140 can be different when the supplemental content 140 is being displayed. The dimensions, as well as other display characteristics, can be indicated by a stylesheet that is included in the metadata. The stylesheet can include a display format for the device on which supplemental content can be displayed. For example, the supplemental content 140 can be displayed horizontally on the laptop device 120 and the mobile device 130. However, the supplemental content 140 can be displayed narrower on the mobile device 130 as compared to the laptop device 120 (e.g., because of the size difference of the displays).

In an example implementation, the metadata can include supplemental data associated with the video data. For example, the video data can include object 145 to be rendered on the display 115. The object can be a three-dimensional (3D) object. The object 145 can have an identification (ID) value and/or label as supplemental data included in the metadata. The ID value and/or label can be used to provide additional functions associated with the corresponding object. For example, the user 105 through operation of the AR headset 110 can drag a replica of the object 145 out of the display. In this implementation, the user 105 can perform an action (e.g., a hand gesture) that can cause the video application (and/or AR application) to determine the ID value and/or label corresponding to the object 145. Then, the video application can use the ID value and/or label to perform an operation. For example, the video application can request a three-dimensional (3D) image from a server based on the ID value and/or label and display the 3D image on the AR headset 110 as though the object 145 is positioned in the environment of the user 105 and having proper dimensions for the environment.

Figure 2:
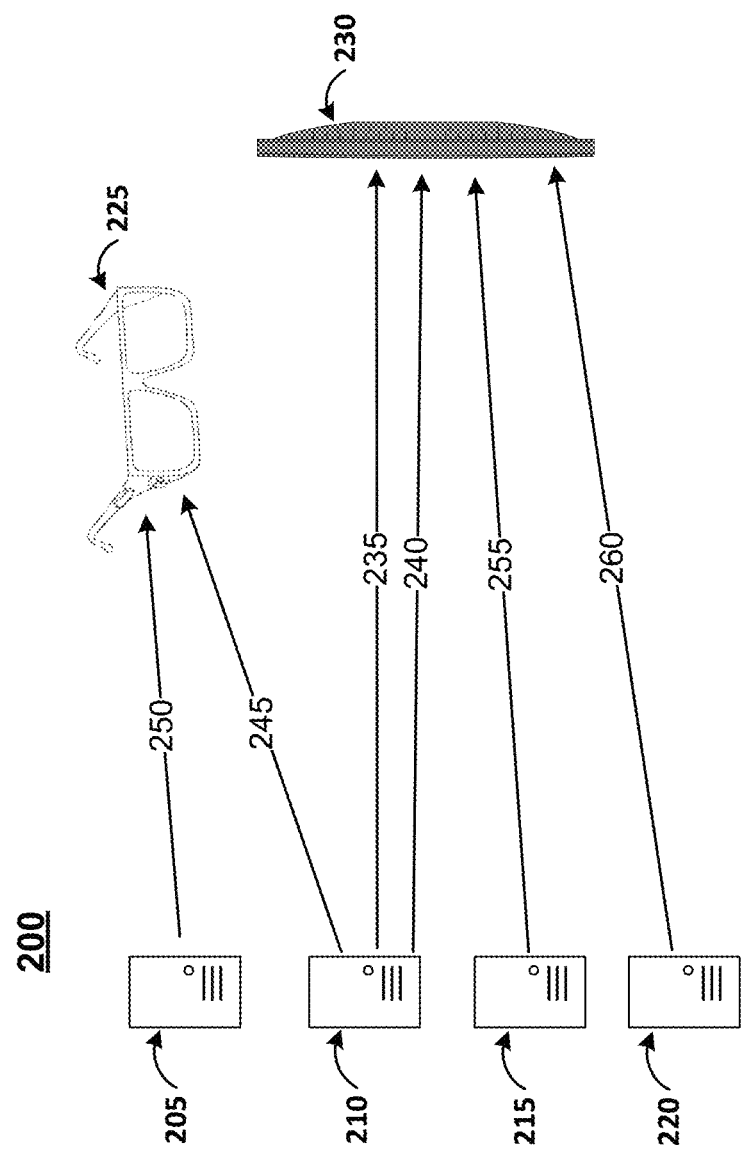
FIG. 2 illustrates a system according to at least one example embodiment.

FIG. 2 illustrates a system according to at least one example embodiment. As shown in FIG. 2 a system 200 includes server 205, 210, 215, 220, AR glasses 225, and a display 230. Server 205, 210, 215, 220 can include at least one layered video and/or a portion (e.g., at least one layer) thereof. The layered video can include video data and metadata. The video data can be displayed on display 230 (e.g., as a main display). The metadata can include supplemental content that can be targeted for display on at least one supplemental display (e.g., displayed outside the boundaries of the display 230). Further, the supplemental content can be moved between the outside the boundaries of the display 230 and the inside the boundaries of the display 230. In the system 200, the supplemental content can be displayed on the AR glasses 225 and/or the display 230.

In an example implementation, the metadata can include supplemental content and/or supplemental data. The video data can be associated with a first layer of the layered video and the metadata can be associated with at least one second layer of the layered video. As shown in FIG. 2, the server 210 can include layered video. The server 210 can include the first layer of the layered video that includes the video data. The first layer of the layered video (e.g., the video data) can be communicated 235 (e.g., streamed) from the server 210 to the display 230. The display 230 can be configured to render the video data. The server 210 can be further configured to communicate 240 at least one second layer of the layered video including metadata to the display 230 and communicate 245 the at least one second layer of the layered video including metadata to the AR glasses 225. In an example implementation, the metadata can include at least a portion of a spherical video. For example, the spherical video could be displayed on the AR glasses 225 such that the spherical video is positioned to line up with the video being shown on the display 230.

Layers of the layered video can be communicated from two or more servers. For example, at least one second layer of the layered video including metadata can also be communicated 250 to the AR glasses 225 from the server 205. Further, at least one second layer of the layered video including metadata can be communicated 255, 260 to the display 230 from the server 215 and the server 220. Any communication from server 205, 210, 215, 220 can be communicated to a different device (not illustrated for clarity). For example, at least one second layer of the layered video including metadata can be communicated (not shown) to the AR glasses 225 from the server 215.

In an example implementation, layers of the layered video that are more closely related to the content of the video data can be communicated from server 210. For example, the video can be of a game or game show. Therefore, the first layer including the video data can be the game or game show feed that is communicated 235 to the display 230 from server 210. The at least one second layer including metadata more closely related to the game or gameshow can be communicated 240 to the display 230 from server 210 and metadata closely related to the game or gameshow can be communicated 245 to the AR glasses 225 from server 210. The metadata can include supplemental content for rendering on the display 230 and/or the AR glasses 225 and/or supplemental data related to what is rendered on the display 230 and/or the AR glasses 225. The metadata more closely related to the game or gameshow can be questions and/or answers to questions, scores, contestant information, an ID value and/or label associated with objects in the game or gameshow, and/or the like.

In an example implementation, layers of the layered video that are less closely related to the content of the video data can be communicated from server 205, 215, 220. Continuing the example above, the at least one second layer including metadata less closely related to the game or gameshow can be communicated 250, 255, 260 to the display 230 and/or the AR glasses 225 from server 205, 215, 220. The metadata can include supplemental content for rendering on the display 230 and/or the AR glasses 225 and/or supplemental data related to what is rendered on the display 230 and/or the AR glasses 225. The metadata less closely related to the game or gameshow can be advertisements, related video content, a news feed, game scores, a programming guide, weather alerts, replica content corresponding to objects in the video, and/or the like.

In an example implementation, the video (or a frame thereof) can be associated with an interactive game stream. For example, a streaming came can include frames of video (corresponding to the interactive game) that are rendered by the streaming server and streamed rendered frame by rendered frame to the display device (e.g., AR glasses 225).

In some implementations, the layered video can be generated as a layered video by the content creator. For example, a layered video can have a background as the first layer and the at least one second layer including metadata can include data associated with objects to be rendered on the background. For example, the metadata can include image data, position data, an ID value and/or label, and/or the like. The streaming application can use a standard (e.g., a newly created standard) configured to (or including instructions used to) interpret the metadata and render the supplemental content (e.g., the objects). However, in some implementations, flat video can be used to generate layered video.

In an example implementation, the metadata can be embedded in the video (or at least one frame thereof). The display 115 (or one of the other display devices) can be configured to extract the metadata from the video before formatting the metadata for display. In other words, the video can be communicated as a flat video and the layered video can be generated by the receiving device. Generating the layered video can include using object recognition, optical character recognition, a machine learned model, and/or the like to extract the metadata from the video. The metadata can be embedded in a portion (e.g., as a rectangle on the bottom) of the video. The embedding can link to metadata. The embedding can be cropped out of the video after being extracted.

Figure 3:
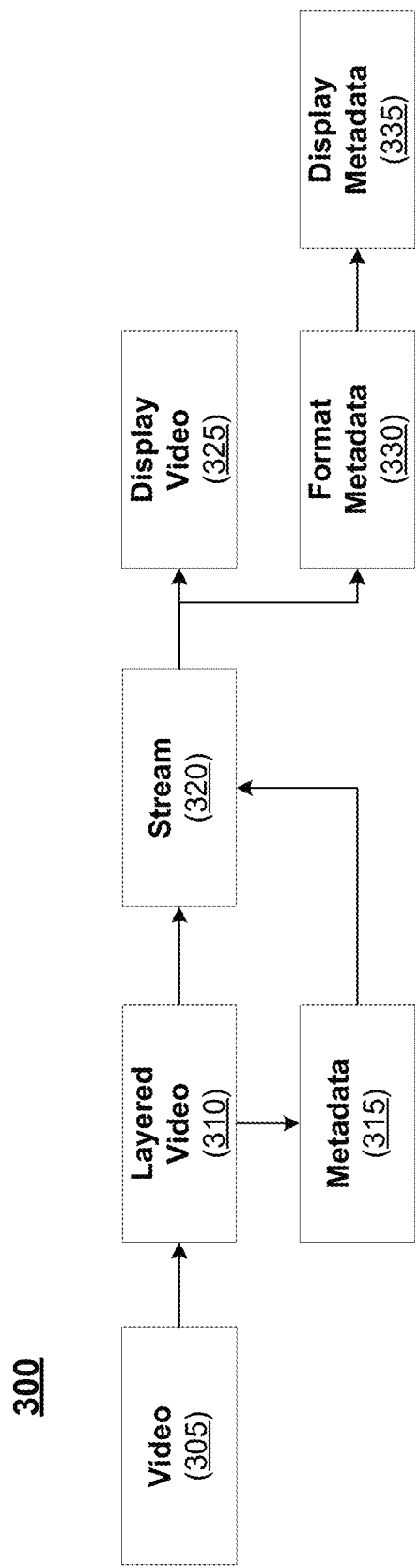
FIG. 3 illustrates a block diagram of a signal flow for generating and displaying layered video according to at least one example embodiment.

FIG. 3 illustrates a block diagram of a signal flow for generating and displaying layered video according to at least one example embodiment. As shown in FIG. 3, a signal flow 300 includes a video 305 block, a layered video 310 block, a metadata 315 block, a stream 320 block, a display video 325 block, a format metadata 330 block, and a display metadata 335 block. As shown in FIG. 3, a video (e.g., a flat video) is received and converted to a layered video including video data and metadata. The video data and the metadata can be communicated (e.g., streamed) to at least one device including a display where the video data can be rendered as video, the metadata (e.g., supplemental content) can be formatted and rendered on top of (or in addition to) the rendered video.

The video 305 can include a broadcast (e.g., over the air and/or cable), a streaming video, a stored video, and/or the like. The video 305 can be a flat video (e.g., a single layer). The video 305 can include a plurality of frames.

The layered video 310 block can include functionality to convert the video 305 to a layered video 310. The layered video 310 can include video data and the metadata 315. The functionality of the layered video block can include object recognition. For example, the object recognition function can be configured to recognize objects in the video 305 and add a layer including metadata based on the at least one object. The at least one object can remain in the video 305 or removed from the video 305. For example, a ticker or banner (e.g., news, weather, channel identification, time, competition scores, and/or the like) may be objects that can be added to the metadata 315 and removed from the video 305. Whereas, furniture in a room, people, vegetation (e.g., trees, plants, and or the like), vehicles, buildings and/or the like may be objects that can be added to the metadata 315 and remain in the video 305.

The stream 320 block can include functionality to communicate the layered video 310 including the metadata 315 to at least one display device. Communicating the layered video can include separating the layered video 310 into frames, compressing the frame, packetizing the compressed frame, scheduling the data packet for communication and communicating the data packet. The layered video 310 can be communicated together with the metadata 315 (e.g., in the same data packet) or separately (e.g., in different data packets). The layered video 310 and the metadata 315 can be communicated to the same display device and/or communicated to different display devices.

The display video 325 block can include functionality to receive, decompress and display video. The display video 325 block can receive at least one data packet from a server. The at least one data packet can include video data and/or metadata. The video data can be compressed video data. The display video 325 block can be configured to decompress the video data and render the decompressed (e.g., reconstructed) video on a display device.

The format metadata 330 block can include functionality to receive, decompress and, if necessary, format metadata. The format metadata 330 block can receive at least one data packet from a server. The at least one data packet can include metadata. The metadata can be compressed video data. The format metadata 330 block can be configured to format the metadata as supplemental content and the display metadata 335 block can be configured to display the supplemental content.

Figure 4A:
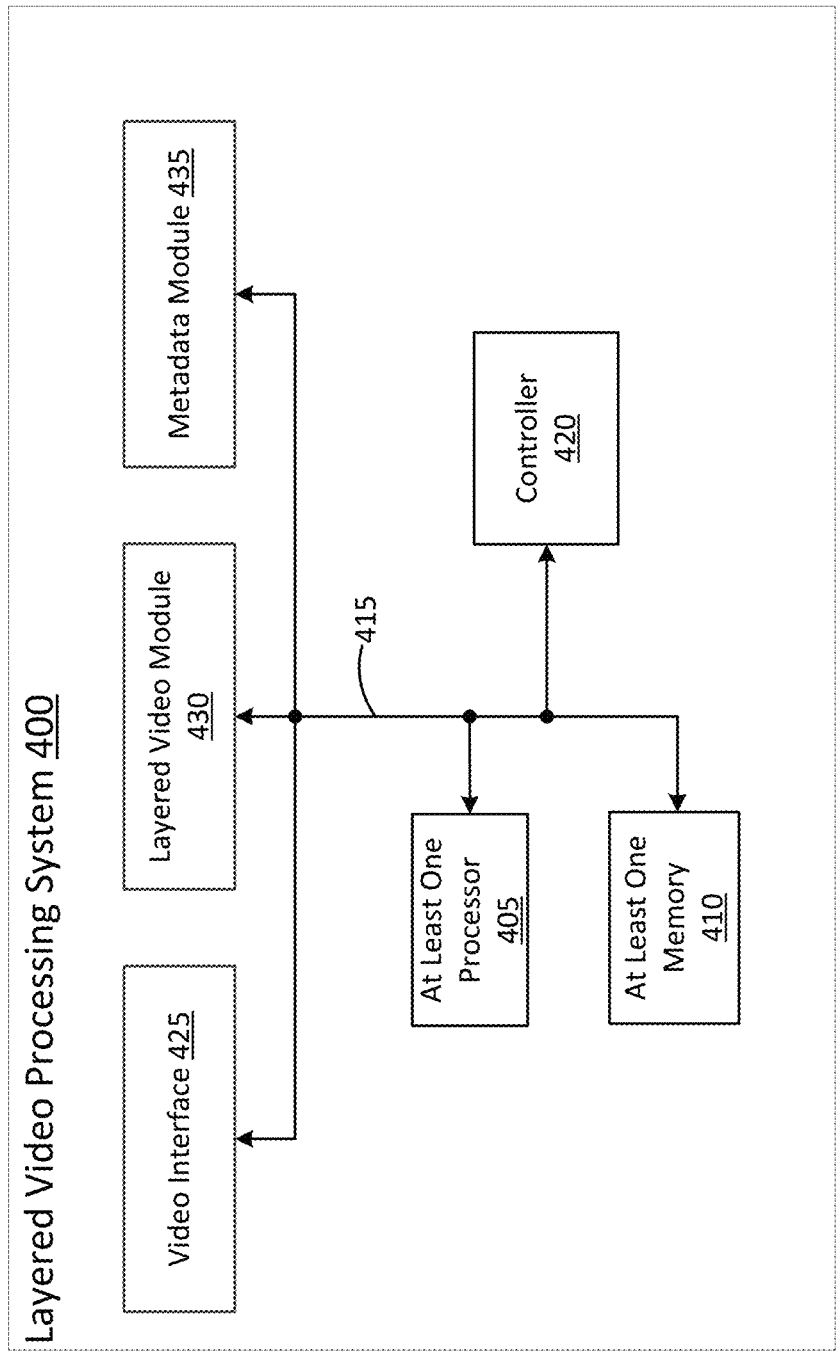
FIG. 4A illustrates a block diagram of a video processing system according to at least one example implementation.

FIG. 4A illustrates a block diagram of a video processing system according to at least one example implementation. As shown in FIG. 4A, a layered video processing system 400 includes at least one processor 405, at least one memory 410, a controller 420, a video interface 425, a layered video module 430, and a metadata module 435. The at least one processor 405, the at least one memory 410, the controller 420, the video interface 425, the layered video module 430 and the metadata module 435 are communicatively coupled via bus 415. The layered video processing system 400 can be implemented in a server (e.g., a streaming server).

The at least one processor 405 can be utilized to execute instructions stored on the at least one memory 410, so as to thereby implement the various features and functions described herein, or additional or alternative features and functions. The at least one processor 405 can be a general-purpose processor. The at least one processor 405 and the at least one memory 410 can be utilized for various other purposes. In particular, the at least one memory 410 can represent an example of various types of memory and related hardware and software which might be used to implement any one of the modules described herein.

The at least one memory 410 can be configured to store data and/or information associated with the layered video processing system 400. For example, the at least one memory 410 can be configured to store code associated with generating and streaming layered video. For example, the at least one memory 410 can be configured to store code associated with generating layered video from flat video, associating metadata (as at least one layer) with the layered video, associating (e.g., using an ID and/or label) actions, images and other video with the layered video, and/or the like. The at least one memory 410 can be a non-transitory computer readable medium with code that when executed by the processor 405 cause the processor 405 to implement one or more of the techniques described herein. The at least one memory 410 can be a shared resource. For example, the layered video processing system 500 can be an element of a larger system (e.g., a computer, a server, a network computer, a network node, and/or the like). Therefore, the at least one memory 410 can be configured to store data and/or information associated with other elements (e.g., image/video rendering, web browsing, computer assistant, and/or wired/wireless communication) within the larger system.

The controller 420 can be configured to generate various control signals and communicate the control signals to various blocks in the layered video processing system 400. The controller 420 can be configured to generate the control signals to implement the techniques described herein. The controller 420 can be configured to control the action module 485 to execute software code to perform a computer-based process according to example embodiments. For example, the controller 420 can generate control signals corresponding to hand gestures of a user of an AR headset when view layered video, controlling supplemental content (e.g., rendering format and placement), and/or the like.

The video interface 425 can be configured to receive a data packet including at least one of video data and metadata. The video interface 425 can be configured to decompress the compressed video data and/or compressed metadata. If the video data is associated with a layered video, the video interface 425 can be configured to assemble the video data (e.g., frames of video) into a layered video or a portion of the layered video. If the video data is associated with a flat video, the video interface 425 can be configured to assemble the video data (e.g., frames of video) into a flat video or a portion of the flat video.

The layered video module 430 can be configured to enable or help enable the techniques described herein. For example, the layered video module 430 can include executable code or code segments configured to perform the techniques described herein. For example, the layered video module 430 can be configured to generate a layered video from a flat video. The layered video module 430 can be configured to perform object recognition on video data. The layered video module 430 can be configured to generate an ID and/or label for the objects. The layered video module 430 can be configured to cause the storing of an action (e.g., generate a replica image) associated with the ID and/or label in the metadata module 435. The layered video module 430 can be configured to cause the storing of metadata (e.g., associated with the conversion of a flat video to a layered video) in the metadata module 435. In some implementations, the layered video includes video data and metadata can be stored together (e.g., as a file) in one location and may be separately served (e.g., in different data packets) to a display device.

The metadata module 435 can be configured to store metadata, metadata action information, and metadata support data. For example, metadata support data can be a stylesheet, video and/or images associated with an object, sporting event scores, news information, weather information, and/or the like. The metadata action data can include actions to be performed based on the metadata. For example, the actions can be to communicate and display an image or video, to search for information, to communicate an advertisement, to communicate a news or sports ticker, and/or the like. The metadata can include a link between an ID and/or label and metadata action information and/or metadata support data.

Figure 4B:
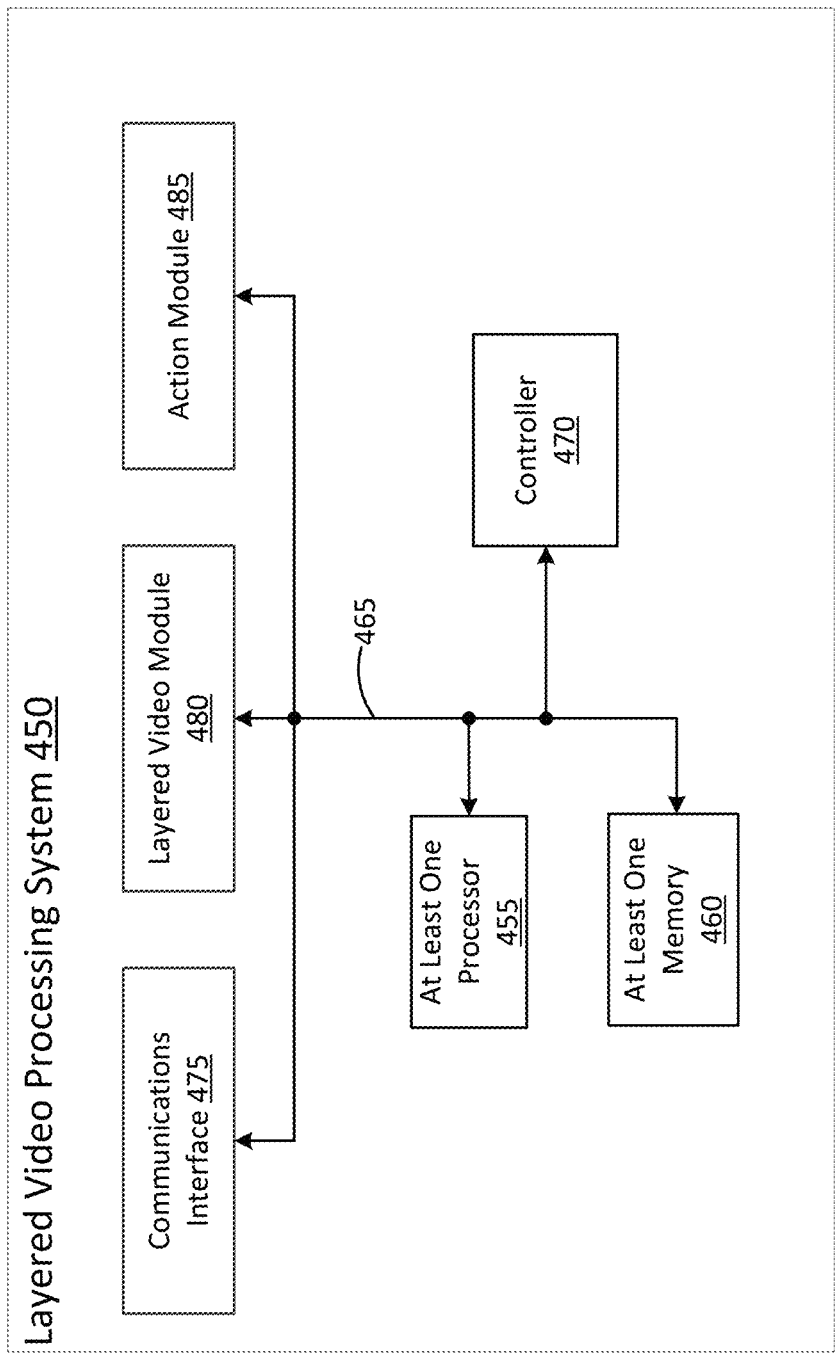
FIG. 4B illustrates a block diagram of a video display processing system according to at least one example implementation.

FIG. 4B illustrates a block diagram of a video processing system according to at least one example implementation.

As shown in FIG. 4B, a layered video processing system 450 includes at least one processor 455, at least one memory 460, a controller 470, a communication interface 475, a layered video module 480, and an action module 485. The at least one processor 455, the at least one memory 460, the controller 470, the communication interface 475, the layered video module 480 and the action module 485 are communicatively coupled via bus 465. The layered video processing system 450 can be implemented in a personal computing device (e.g., an AR headset, a smart watch, a mobile device, a laptop, a smart television, and/or the like).

The at least one processor 455 can be utilized to execute instructions stored on the at least one memory 460, so as to thereby implement the various features and functions described herein, or additional or alternative features and functions. The at least one processor 455 can be a general-purpose processor. The at least one processor 455 can be a graphics processing unit (GPU). The at least one processor 455 and the at least one memory 460 can be utilized for various other purposes. In particular, the at least one memory 460 can represent an example of various types of memory and related hardware and software which might be used to implement any one of the modules described herein.

The at least one memory 460 can be configured to store data and/or information associated with the layered video processing system 450. For example, the at least one memory 460 can be configured to store code associated with streaming layered video. For example, the at least one memory 460 can be configured to store code associated with rendering supplemental content, identifying a gesture, implementing a computer display operation, and/or the like. The at least one memory 460 can be a non-transitory computer readable medium with code that when executed by the processor 455 cause the processer 455 to implement one or more of the techniques described herein. The at least one memory 460 can be a shared resource. For example, the layered video processing system 450 can be an element of a larger system (e.g., a server, a personal computer, a mobile device, a head-mount display, smart glasses, a hands-free computer device, and the like). Therefore, the at least one memory 460 can be configured to store data and/or information associated with other elements (e.g., image/video rendering, web browsing, computer assistant, and/or wired/wireless communication) within the larger system.

The controller 470 can be configured to generate various control signals and communicate the control signals to various blocks in the layered video processing system 450. The controller 470 can be configured to generate the control signals to implement the techniques described herein. The controller 470 can be configured to control the action module 735 to execute software code to perform a computer-based process according to example embodiments. For example, the controller 470 can generate control signals corresponding to parameters to implement a search for information and/or an image(s) based on an ID and/or label, control supplemental content, store data, execute supplemental content formatting and rendering, and/or the like.

The communication interface 475 can be configured to receive a data packet including at least one of video data and metadata. The video interface 425 can be configured to decompress the compressed video data and/or compressed metadata. If the video data is associated with a layered video, the video interface 425 can be configured to assemble the video data (e.g., frames of video) into a layered video or a portion of the layered video.

The layered video module 480 can be configured to render the video data, format supplemental content and maintain a link between the video data and the metadata. The layered video module 480 can be configured to identify displays on which the video data and/or the supplemental content may be rendered. The formatting of the supplemental data can be based on the display and a stylesheet (also metadata).

The action module 485 can be configured to cause an action to be performed. The action can be based on metadata and/or include the use of metadata. For example, as discussed with regard to FIG. 1, a hand gesture can cause the display of an object presented in a video being rendered on a main display to be presented on an AR headset. The layered video module 480 can be configured to use an ID and/or label associated with the object to look up the action to be performed and/or request an instruction from a server as to the action to be performed. In this example, an image (e.g., a 3D image) can be received from the server and be rendered on the AR headset such that the object appears in the environment of the user of the AR headset.

Figure 5:
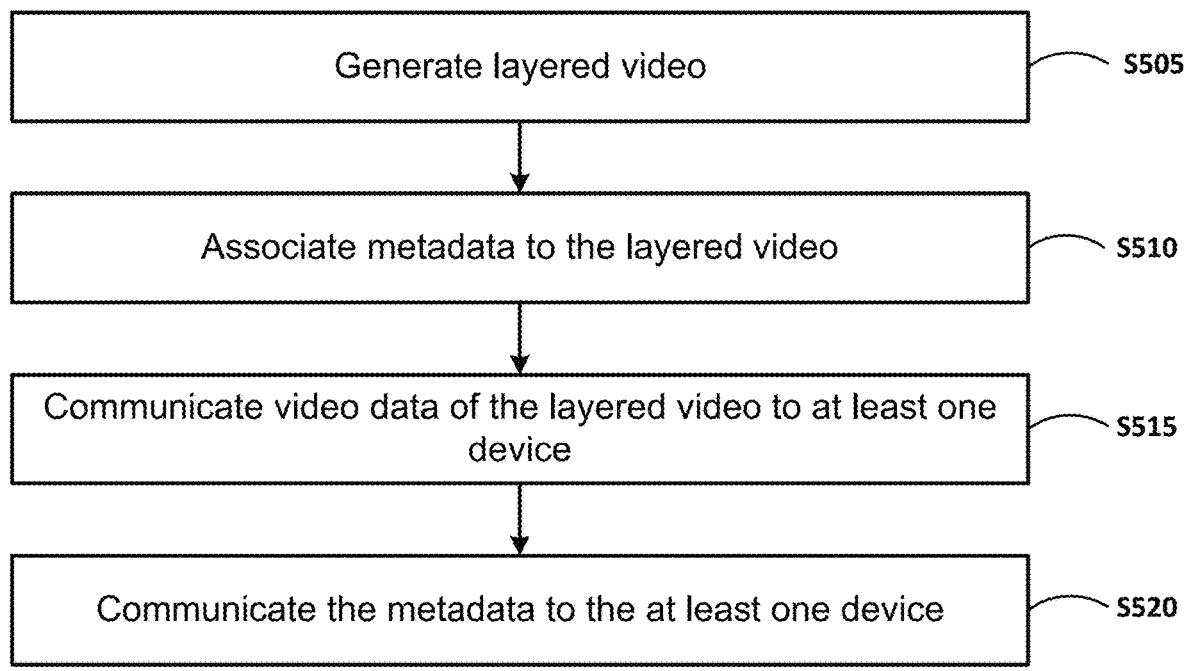
FIG. 5 illustrates a flowchart of a method for generating and communicating a layered video according to at least one example embodiment.
Figure 6:
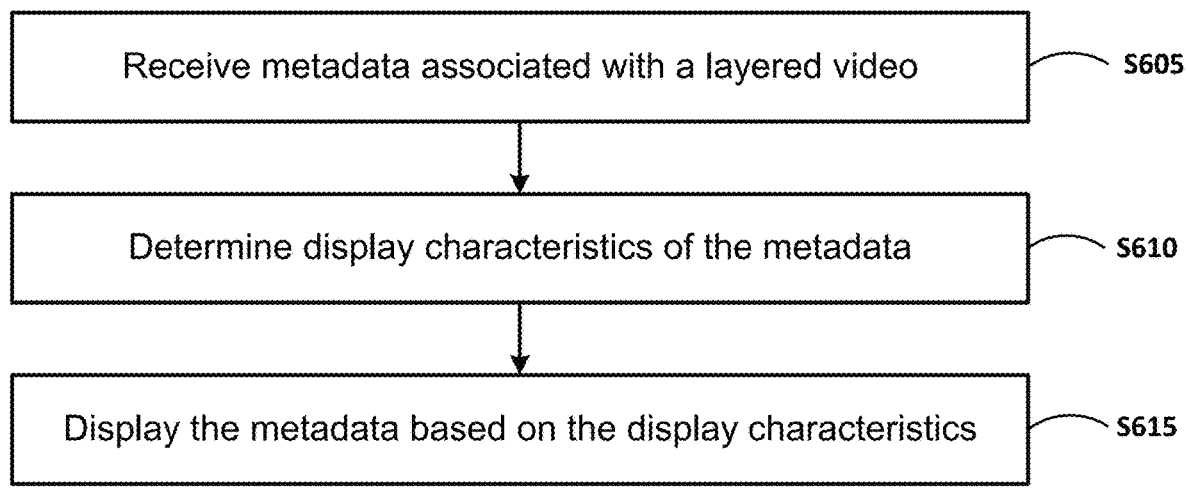
FIG. 6 illustrates a flowchart of a method for processing metadata including visual content according to at least one example embodiment.
Figure 7:
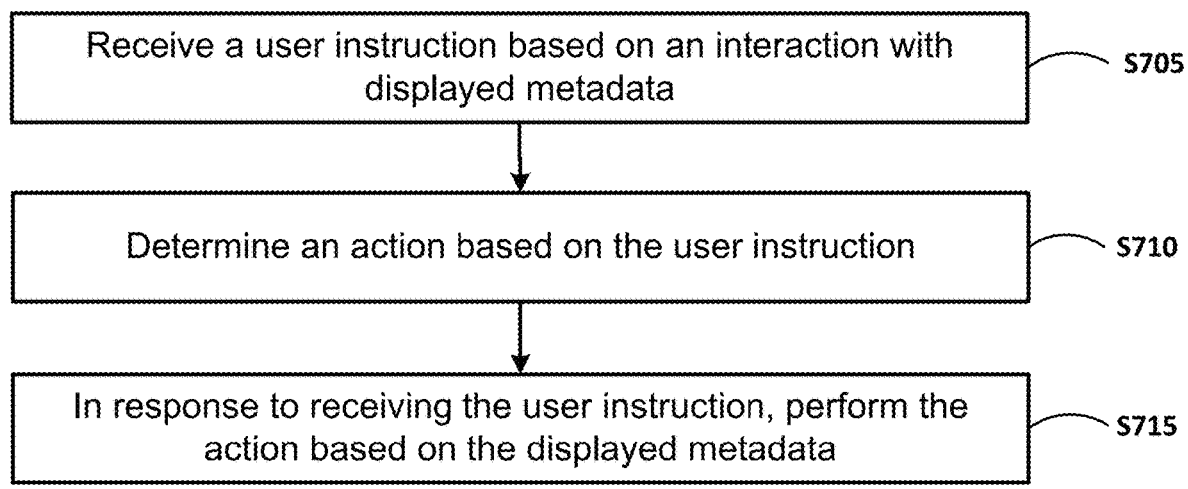
FIG. 7 illustrates a flowchart of a method processing a user instruction according to at least one example embodiment.

FIGS. 5, 6, and 7 illustrate block diagrams of methods according to at least one example embodiment. The steps described with regard to FIGS. 5, 6, and 7 may be performed due to the execution of software code stored in a memory (e.g., at least one memory 410, 460) associated with an apparatus (e.g., as shown in FIGS. 4A and 4B) and executed by at least one processor (e.g., at least one processor 405, 455) associated with the apparatus. However, alternative embodiments are contemplated such as a system embodied as a special purpose processor. Although the steps described below are described as being executed by a processor, the steps are not necessarily executed by the same processor. In other words, at least one processor may execute the steps described below with regard to FIGS. 5, 6, and 7.

As discussed above, a layered video can be generated during the creation by the content developer. However, if a source video is a flat video (e.g., not a layered video), a layered video can be generated based on the flat video. FIG. 5 illustrates a flowchart of a method for generating and communicating a layered video according to at least one example embodiment. As shown in FIG. 5, in step S505 a layered video is generated. For example, object recognition (e.g., a trained machine learning model) can be used to recognize objects in an input video. A data structure representing a layered video can be generated. The data structure can include a first layer to include video data and at least one second layer including metadata. The layer including video data can be generated based on the flat video and the metadata can be generated based on the at least one object.

In step S510 metadata is associated with the layered video. The at least one object can remain in the flat video (and therefore the video data) or removed from the flat video and stored as metadata. For example, a ticker or banner (e.g., news, weather, channel identification, time, competition scores, and/or the like) may be objects that can be added as one of the at least one layer as metadata and removed from the flat video and not included in the video data. Whereas, furniture in a room, people, vegetation (e.g., trees, plants, and or the like), vehicles, buildings and/or the like may be objects that can be added as one of the at least one layer as metadata and remain in the flat video and included in the video data. In addition, metadata that is not content (e.g., visual or audible) can be added based on the at least one object. For example, an ID and/or a label identifying the at least on object can be added as metadata in the at least one layer.

The layers in the layered video can be separately communicated (e.g., streamed). For example, in step S515 the video data of the layered video is communicated to at least one device. In other words, the first layer can be packetized, and the data packet can be communicated to at least one device.

In step S520 the metadata is communicated to the at least one device. For example, the at least one layer can be packetized, and the data packet can be communicated to at least one device. The data packet can be communicated to the same device as the data packet including the video data or a different device. Further, additional metadata (e.g., metadata not based on the at least one object) can be communicated to the at least one device. The additional metadata can supplement the video data. For example, the additional metadata can include information about the at least one object, commercial data, purchasing information, and/or the like. The data packet can be communicated from the same server as the data packet including the video data or a different server.

Data packets including video data can be processed and rendered by the device receiving the video data using standard techniques. However, example implementations include techniques to process the data packets including metadata. FIG. 6 illustrates a flowchart of a method for processing metadata including visual content according to at least one example embodiment. As shown in FIG. 6, in step S605 metadata associated with a layered video is received. For example, the metadata can be received in a data packet from a server. The metadata can include supplemental content (e.g., images, video, and/or text to be rendered on a display). In some implementations, the metadata can be compressed (or encoded). Therefore, receiving the metadata can include decompressing (or decoding) the metadata.

In step S610 display characteristics of the metadata is determined. For example, the metadata can include text to be rendered on a display as supplemental content. As discussed above, the supplemental content can be targeted for display on a main display (e.g., displayed within the boundaries of a main display) and/or targeted for display on a supplemental display (e.g., outside the boundaries of the main display). Targeting the supplemental content for display on a supplemental device can include targeting the supplemental content for display on at least one device. The at least one device can include an AR headset, a laptop computer, a tablet computer, a television, a mobile device, a smart watch and/or the like. Determining display characteristics can include determining the characteristics used to display the supplemental content on a display of the at least one device. The display characteristics can be determined using a stylesheet. For example, the display characteristics for the supplemental data can be determined by looking up the at least one device in the stylesheet.

In step S615 the metadata is displayed based on the display characteristics. For example, the supplemental content can be formatted for display as video (or a frame of a video or an image) and rendered on the main display and/or the display of the at least one device. In an example implementation, the at least one device can be an AR headset.

In this implementation, rendering the supplemental content can include displaying the supplemental content outside the boundaries of the main display such that when a user of the AR headset gazes at the location outside the boundaries of the main display, the supplemental content can be rendered on a display of the AR headset. In other words, in response to the user of the AR headset moving a gaze outside the boundaries of the main display, displaying the formatted metadata (e.g., the supplemental content) on the AR headset. Further, in response to the user of the AR headset moving the gaze inside the boundary of the main display, hiding the formatted metadata. In another example implementation, the metadata can be an image (e.g., a 3D image) as a replica of an object in the video being rendered on the main display. In this implementation, the user of the AR headset can place the image as a replica of the object in the user's environment as a virtual object. In an example implementation, the main display can be viewed by a first user and the display of the at least one device can be viewed by another user. Further, the viewer of the main device can cause the supplemental content, video and/or image to be displayed on the at least one device and viewed by the other user.

In an example implementation the supplemental display can be associated with an augmented reality (AR) headset. The formatting of the metadata for display can include formatting the metadata, as supplemental content, for display on the AR headset and displaying the formatted metadata, as supplemental content, on the AR headset. For example, the supplemental content can be displayed on the AR headset such that the supplemental content is displayed on top of the main display. Further, the AR headset can have a wide field of view that can enable a user to view the supplemental content in the user's peripheral vision.

FIG. 7 illustrates a flowchart of a method processing a user instruction according to at least one example embodiment. As shown in FIG. 7, in step S705 a user instruction based on an interaction with displayed metadata is received. For example, the user instruction can be virtual (e.g., moving a gaze, a hand gesture, and/or the like), the user instruction can be audible, the user instruction can be via a device (e.g., a remote control, a keyboard, a handheld device), and/or the like.

In step S710 an action based on the user instruction is determined. For example, a computing device can look-up the user instruction in a table or map that associates the user instruction with an action. The table or map can be on a server. Therefore, the user instruction can be communicated to the server and an action (and supplemental data) can be received from the server.

In step S715 in response to receiving the user instruction, perform the action based on the displayed metadata. For example, as discussed above, in response to the user of the AR headset moving a gaze outside the boundaries of the main display, displaying the formatted metadata (e.g., the supplemental content) on the AR headset. Further, in response to the user of the AR headset moving the gaze inside the boundary of the main display, hiding the formatted metadata. In some implementations, the action can be to display information about an object. Therefore, the information can be searched for (e.g., by the server) and, when located, formatted and displayed on the main device and/or the at least one device.

In an example implementation, an ID and/or a label in the metadata can be associated with an object, an action, and/or the like. For example, in response to selecting (e.g., using a hand gesture) an object, an advertisement associated with the object can be displayed (e.g., as a layer). The ID and/or a label can be used to link with a server containing semantic and spatial metadata about the scenes within a video (e.g., withing the video data in the layered video. The semantic data can be labeled using a new common standard (e.g., title, description, and/or the like) for client devices to interpret and display according to the characteristics of the form factor (e.g., tablet vs. smart watch) of the device. The spatial data can include common rules indicating how the metadata should be displayed (e.g., using stylesheet properties to specify color, position, size, and/or the like). The metadata can include information extracted using computer vision technology. The metadata can be associated with a start/end time stamp. The metadata can have default display properties or characteristics set by the content creator (e.g., revealing a scoreboard for a period of time after a goal is scored).

In an example implementation, a visual and/or audio signal can be used to fingerprint the content and to associate the content with an established metadata repository. For example, fingerprinting can include a creator inserting ultrasonic markers into the content, the creator can use computer vision technology to match with frames in a layered video, the creator can use a visual code in a video, a portion of the video, and/or a frame of the video, and/or a third party (e.g., independent of the creator) system can generate audio or visual markers for a video, a portion of the video, and/or a frame of the video. In an example implementation, a layered video format can be used to stream multiple layers containing all or parts of the information (e.g., rather than just an ID). Further, the application (e.g., use of, instantiation of, and/or the like) of the metadata can span beyond a single device (e.g., AR glasses, a tablet and/or the like) and/or as a click into the supplemental content on the device (e.g., the main display or another display).

Metadata can be associated with a prompts, responses to prompts and/or actions based on the response. A game or game show can include enabling a user to select a set of prompts (e.g., A, B, C, D as answers to a question). Enable the game to generate and display responses to the prompts. The response reaction may be communicated and displayed in real-time. The response metadata may be established in advance (e.g., stored in a memory of the display device). The responses can be displayed on either the primary (or main) display device (e.g., a shared TV), a personal mobile device, a personal auditory device, and/or the like.

Metadata can be associated with user options, preferences, attributes and/or the like. For example, as discussed above, a supplemental content can be displayed on the main display for a period of time. This period of time can be user configured using an option or preference. For example, commercial transactions (e.g., purchasing using prompts) can be implemented by dynamically adapting metadata and consumer options given the user's own attributes or preferences (e.g., as stored in a configuration file, device location, and/or the like). A bidding system can be added to endpoint sale options as metadata in a layered video. For example, an ad for a speaker may be displayed as supplemental content (e.g., a layer including metadata). A user who wants to purchase the product in the ad can see the option (implemented as supplemental content using metadata) to purchase from two or more sellers or stores. The sellers can bid (offline via an advertisement application) for ranking/placement in the supplemental content. The product manufacture may charge a fee for the ranking/placement and recoup some of its ad costs by collecting revenue from the bidders.

Layered video can be implemented on or as content (e.g., advertisements) independent of content creators. For example, advertisements may be skipped (e.g., indicated as not interested) through user interaction with the layered video. Layered video can be implemented as a sporting event. Layers (as metadata) can provide information about teams, players, other related events, upcoming events, products (e.g., hats, shirts, and/or the like) related to the teams, and/or the like. Supplemental content can be controlled through user interaction with the layered video.

Supplemental content (e.g., advertisements) can be triggered in response to a user action. For example, as discussed above, an object in a layered video can be replicated and displayed using an AR headset. An advertisement related to the object can be triggered (and displayed) in response to the selection and replication of the object.

Home improvement shows can use layered video to provide supplemental content. For example, more detailed how to images or video, product information, contractor information, alternative tools or products, and/or the like. The supplemental content can be controlled through user interaction with the layered video. For example, a button of a TV remote control can be used to show or hide the supplemental content.

User entertainment (e.g., web-based gaming) can be implemented as layered video. For example, a web-based game can render frames of the game and communicate the rendered frames as video data. At least one layer of the layered video can include metadata supporting the web-based game. For example, the metadata can include prompts, question and answer content, instrument options (weapons, vehicles, game skins), multi-player games in-progress, and/or the like. In other words, while the game engine is generating and communicating the frames of the game, supplemental content can be communicated and displayed using layered video. The supplemental content can be controlled through user interaction with the layered video. For example, the user can interact with the layered video through use of a game controller. The user can show or hide supplemental content (e.g., instrument options) by interacting with the game controller.

Figure 8:
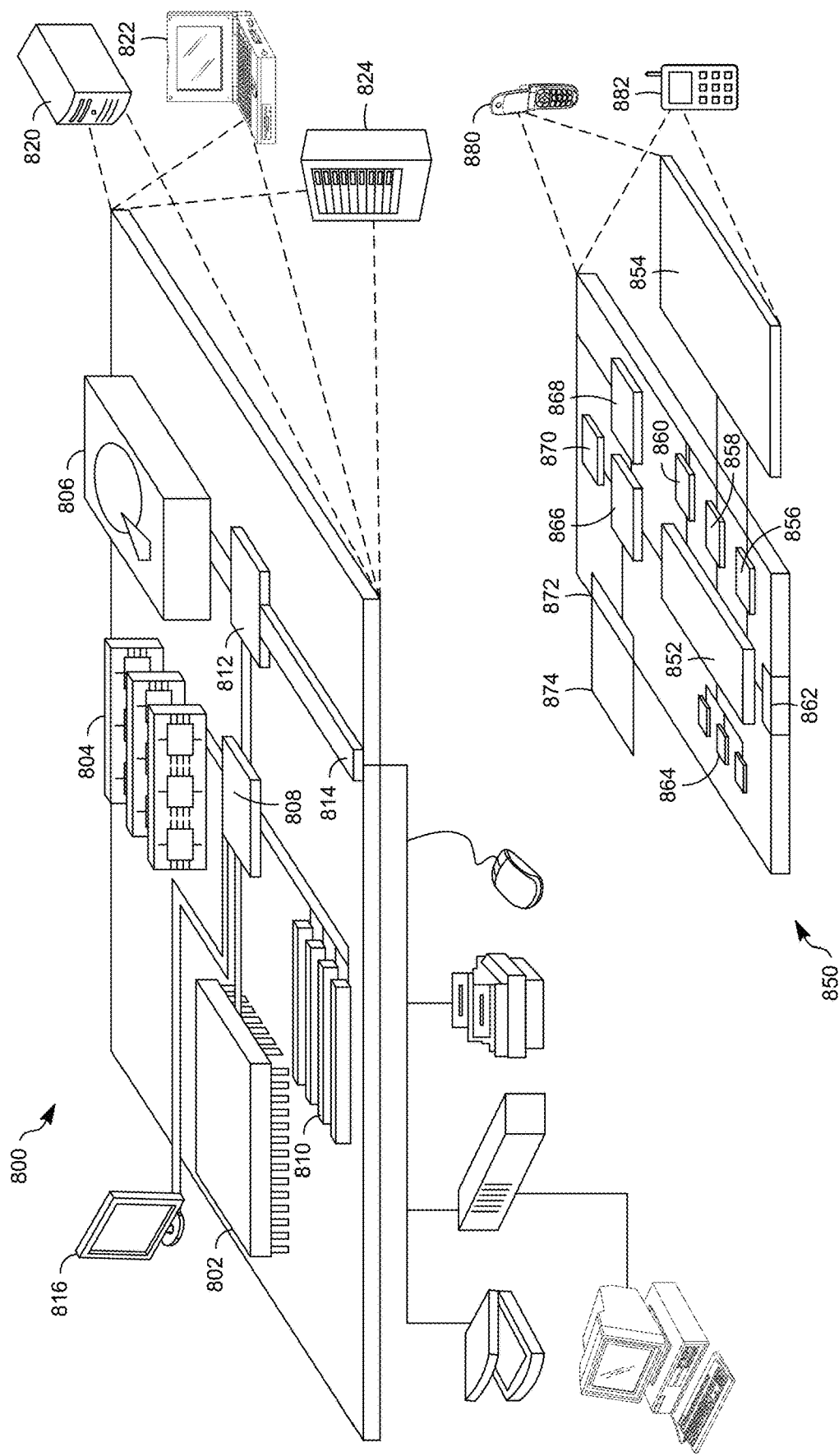
FIG. 8 shows an example of a computer device and a mobile computer device according to at least one example embodiment.

FIG. 8 shows an example of a computer device 800 and a mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850 or may also store applications or other information for device 850. Specifically, expansion memory 874 may include instructions to carry out or supplement the processes described above and may include secure information also. Thus, for example, expansion memory 874 may be provide as a security module for device 850 and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
    receiving at least one frame of a video targeted for display on a main display;
    receiving metadata associated with the at least one frame of the video, the metadata being targeted for display on a supplemental display;
    in response to detecting the presence of the supplemental display:
        formatting the metadata for display on the supplemental display, and
        displaying the formatted metadata on the supplemental display; and
    in response to determining the supplemental display is no longer present, hiding the metadata.

2. The method of claim 1, wherein the at least one frame of the video is included in a first layer of a layered video and the metadata is included in at least one second layer of the layered video.

3. The method of claim 1, wherein
    the supplemental display is associated with an augmented reality (AR) headset, and
    the formatting of the metadata for display includes formatting the metadata for display on the AR headset, the method further comprising displaying the formatted metadata on the AR headset.

4. The method of claim 1, wherein
    the supplemental display is associated with an augmented reality (AR) headset,
    the formatting of the metadata for display includes formatting the metadata for display on the AR headset,
    in response to a user of the AR headset moving a gaze outside a boundary of the main display, displaying the formatted metadata on the AR headset, and in response to the user of the AR headset moving the gaze inside the boundary of the main display, hiding the formatted metadata.

5. The method of claim 1, wherein
the formatting of the metadata for display includes formatting the metadata for display on the main display,
in response to a first action of a viewer of the main display, displaying the formatted metadata on the main display, and
in response to a second action of the viewer of the main display, hiding the formatted metadata.

6. The method of claim 1, wherein
the formatting of the metadata for display includes formatting the metadata for display on the main display,
in response to a first time-based trigger, displaying the formatted metadata on the main display, and
in response to a second time-based trigger, hiding the formatted metadata.

7. The method of claim 1, wherein
the formatting of the metadata for display includes formatting the metadata for display on the main display,
in response to a first event-based trigger, displaying the formatted metadata on the main display, and
in response to a second event-based trigger, hiding the formatted metadata.

8. The method of claim 1, wherein
the supplemental display is associated with a computing device,
the formatting of the metadata for display includes formatting the metadata for display on the computing device,
in response to a first action of a user of the computing device, displaying the formatted metadata on a display of the computing device, and
in response to a second action of the user of the computing device, hiding the formatted metadata.

9. The method of claim 8, wherein the computing device is at least one of a laptop computer, a desktop computer, a television, a smart watch, a tablet, and a mobile device.

10. The method of claim 1, wherein the metadata includes a stylesheet, the method further comprising:
determining a device to display the metadata on; and
looking-up a display format for the device in the stylesheet, wherein the formatting of the metadata for display includes using the format looked-up in the stylesheet.

11. The method of claim 1, wherein
the metadata includes first metadata received from a first remote device, and
second metadata received from a second remote device.

12. The method of claim 1, wherein the at least one frame of a video is associated with an interactive game stream.

13. The method of claim 1, wherein the metadata is embedded in the at least one frame of the video, the method further comprising extracting the metadata from the at least one frame of the video before formatting the metadata for display.

14. The method of claim 1, wherein the metadata includes at least one three-dimensional object.

15. The method of claim 1, wherein the metadata includes at least a portion of a spherical video.

16. A non-transitory computer-readable storage medium having stored thereon computer executable program code which, when executed on a computer system, causes the computer system to perform a method comprising:
receiving at least one frame of a video targeted for display on a main display;
receiving metadata associated with the at least one frame of the video, the metadata being targeted for display on a supplemental display;
formatting the metadata for display on the supplemental display;
in response to detecting the presence of the supplemental display, displaying the formatted metadata on the supplemental display; and
in response to determining the supplemental display is no longer present, hiding the formatted metadata.

17. The non-transitory computer-readable storage medium of claim 16, wherein the at least one frame of the video is included in a first layer of a layered video and the metadata is included in at least one second layer of the layered video.

18. The non-transitory computer-readable storage medium of claim 16, wherein
the supplemental display is associated with an augmented reality (AR) headset, and
the formatting of the metadata for display includes formatting the metadata for display on the AR headset, the method further comprising displaying the formatted metadata on the AR headset.

19. The non-transitory computer-readable storage medium of claim 16, wherein
the supplemental display is associated with an augmented reality (AR) headset,
the formatting of the metadata for display includes formatting the metadata for display on the AR headset,
in response to a user of the AR headset moving a gaze outside a boundary of the main display, displaying the formatted metadata on the AR headset, and
in response to the user of the AR headset moving the gaze inside the boundary of the main display, hiding the formatted metadata.

20. The non-transitory computer-readable storage medium of claim 16, wherein
the formatting of the metadata for display includes formatting the metadata for display on the main display,
in response to a first action of a viewer of the main display, displaying the formatted metadata on the main display, and
in response to a second action of the viewer of the main display, hiding the formatted metadata.

21. The non-transitory computer-readable storage medium of claim 16, wherein
the formatting of the metadata for display includes formatting the metadata for display on the main display,
in response to a first time-based trigger, displaying the formatted metadata on the main display, and
in response to a second time-based trigger, hiding the formatted metadata.

22. The non-transitory computer-readable storage medium of claim 16, wherein
the formatting of the metadata for display includes formatting the metadata for display on the main display,
in response to a first event-based trigger, displaying the formatted metadata on the main display, and
in response to a second event-based trigger, hiding the formatted metadata.

23. The non-transitory computer-readable storage medium of claim 16, wherein
the supplemental display is associated with a computing device,
the formatting of the metadata for display includes formatting the metadata for display on the computing device, in response to a first action of a user of the computing device, displaying the formatted metadata on a display of the computing device, and in response to a second action of the user of the computing device, hiding the formatted metadata.

24. The non-transitory computer-readable storage medium of claim 23, wherein the computing device is at least one of a laptop computer, a desktop computer, a television, a smart watch, a tablet, and a mobile device.

25. The non-transitory computer-readable storage medium of claim 16, wherein the metadata includes a stylesheet, the method further comprising:
determining a device to display the metadata on; and
looking-up a display format for the device in the stylesheet, wherein the formatting of the metadata for display includes using the format looked-up in the stylesheet.

26. The non-transitory computer-readable storage medium of claim 16, wherein
the metadata includes first metadata received from a first remote device, and
second metadata received from a second remote device.

27. The non-transitory computer-readable storage medium of claim 16, wherein the at least one frame of a video is associated with an interactive game stream.

28. The non-transitory computer-readable storage medium of claim 16, wherein the metadata is embedded in the at least one frame of the video, the method further comprising extracting the metadata from the at least one frame of the video before formatting the metadata for display.

29. The non-transitory computer-readable storage medium of claim 16, wherein the metadata includes at least one three-dimensional object.

30. The non-transitory computer-readable storage medium of claim 16, wherein the metadata includes at least a portion of a spherical video.

31. A non-transitory computer-readable storage medium having stored thereon computer executable program code which, when executed on a computer system, causes the computer system to perform a method comprising:
receiving at least one frame of a video configured to be displayed within a boundary of a main display;
receiving metadata associated with the at least one frame of the video, the metadata being configured to be displayed outside the boundary of the main display;
in response to detecting a user gaze outside the boundary of the main display:
formatting the metadata for display outside the boundary of the main display, and
displaying, outside the boundary of the main display, the metadata; and
in response to determining the user gaze is no longer outside the boundary of the main display, hiding the metadata.

32. The non-transitory computer-readable storage medium of claim 31, wherein the at least one frame of the video is included in a first layer of a layered video and the metadata is included in at least one second layer of the layered video.

33. The non-transitory computer-readable storage medium of claim 31, wherein the formatting of the metadata for display includes formatting the metadata for display on an AR headset,
in response to a user of the AR headset moving a gaze outside the boundary of the main display, displaying the formatted metadata on the AR headset, and
in response to the user of the AR headset moving the gaze inside the boundary of the main display, hiding the formatted metadata.

* * * * *